(12) United States Patent
Dai Javad

(10) Patent No.: US 8,175,561 B2
(45) Date of Patent: May 8, 2012

(54) AUTOMATIC OPTIMIZATION OF RF RECEIVER INTERFERENCE PERFORMANCE

(75) Inventor: Patrik Dai Javad, Stockholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1001 days.

(21) Appl. No.: 12/047,596

(22) Filed: Mar. 13, 2008

(65) Prior Publication Data

US 2009/0233553 A1    Sep. 17, 2009

(51) Int. Cl.
*H04B 17/00* (2006.01)
*H04B 1/06* (2006.01)
*H04B 7/00* (2006.01)

(52) U.S. Cl. ............. 455/226.1; 455/67.11; 455/226.2; 455/232.1

(58) Field of Classification Search .......... 455/63.1, 455/67.11, 67.13, 226.1–226.4, 232.1, 234.1, 455/234.2, 254
See application file for complete search history.

(56) References Cited

U.S. PATENT DOCUMENTS

| | | | | |
|---|---|---|---|---|
| 4,502,152 A * | 2/1985 | Sinclair | ............................ | 455/73 |
| 6,507,179 B1 * | 1/2003 | Jun et al. | ......................... | 323/313 |
| 6,748,200 B1 * | 6/2004 | Webster et al. | ............ | 455/234.1 |
| 7,233,130 B1 * | 6/2007 | Kay | ............................... | 323/222 |
| 7,299,021 B2 * | 11/2007 | P rssinen et al. | ........... | 455/226.1 |
| 7,457,598 B2 * | 11/2008 | Zahm et al. | ................. | 455/245.1 |
| 7,720,457 B2 * | 5/2010 | Lucinian | ........................ | 455/296 |
| 7,962,109 B1 * | 6/2011 | Stockstad et al. | ........... | 455/115.1 |
| 2002/0037706 A1 * | 3/2002 | Ichihara | ......................... | 455/324 |
| 2004/0218576 A1 * | 11/2004 | Imagawa et al. | ............... | 370/342 |
| 2005/0025088 A1 * | 2/2005 | Choi | .............................. | 370/321 |
| 2005/0110474 A1 * | 5/2005 | Ortiz et al. | ..................... | 323/282 |
| 2005/0197092 A1 * | 9/2005 | Darabi | .......................... | 455/323 |
| 2006/0079196 A1 * | 4/2006 | Atsumi | ......................... | 455/313 |
| 2006/0281411 A1 * | 12/2006 | Isaac et al. | ..................... | 455/63.1 |
| 2007/0129038 A1 * | 6/2007 | Ragan et al. | ................. | 455/226.4 |
| 2008/0076373 A1 * | 3/2008 | Takahashi et al. | .......... | 455/249.1 |
| 2008/0160948 A1 * | 7/2008 | Kim | ........................... | 455/250.1 |
| 2008/0186076 A1 * | 8/2008 | Kawama | ....................... | 327/336 |
| 2009/0156147 A1 * | 6/2009 | Rofougaran | ............... | 455/226.2 |

* cited by examiner

*Primary Examiner* — Simon Nguyen
(74) *Attorney, Agent, or Firm* — Renner, Otto, Boisselle & Sklar, LLP

(57) ABSTRACT

A method and apparatus for optimization of RF receiver interference performance in a mobile phone operating in a TDMA communications system is disclosed. The battery supply voltage ripple of the battery of the mobile phone is measured and it is determining when the battery supply voltage ripple is greater than a predetermined level. The RF receiver is adjusted to improve the mode of operation of the RF receiver when the battery supply voltage ripple is greater than the predetermined level.

12 Claims, 5 Drawing Sheets

AUTOMATIC OPTIMIZATION OF RF RECEIVER INTERFERENCE PERFORMANCE

TECHNICAL FIELD OF THE INVENTION

The present invention relates to RF receivers and more particularly to a method and apparatus for automatic optimization of RF receiver interference performance in a mobile phone.

DESCRIPTION OF RELATED ART

There are many types of digital communications systems. Traditionally, frequency-division-multiple-access (FDMA) is used to divide the spectrum up into a plurality of radio channels corresponding to different carrier frequencies. These carriers may be further divided into time slots, generally referred to as time-division-multiple-access (TDMA), as is done, for example, in the digital advanced mobile phone service (D-AMPS) and the global system for mobile communication (GSM) standard digital cellular systems. Alternatively, if the radio channel is wide enough, multiple users can use the same channel using spread spectrum techniques and code-division-multiple-access (CDMA).

In mobile phone applications, where several RF transceivers are placed close to each other, there are RF interferences from RF transmitters to RF receivers. Traditionally, the RF interference, i.e., transmitter noise and spurious as well as receiver saturation due to (out of and) blocking (compression), are avoided by implementing sufficient RF filters in combination with well chosen placement the different antennas (needed for respective frequency band) in order to achieve acceptable antenna-antenna isolation. If some radios are using the same frequency band, then other methods are normally used, e.g., an RF coexistence PTA algorithm.

For receivers intended for mobile phone applications, e.g., GPS receivers, it is common that various methods are supported in order to improve (optimize) performance in presence of interference sources where the RF interference source is a system (standard) based upon TDMA principles. For example, normally a signal from the mobile phone platform which is used to enable the GSM transmitter (normal duty cycle of this signal and transmitter is 1/8 or 2/8 for GSM) can also be input to a GPS receiver, which would adapt its internal gain in order to optimize performance.

One problem with the above-identified methods is that normally features/functions for optimizing performance in an interference prone environment require some kind of host control (software control) for enabling such features provided by RF chipset providers. Also, mobile phone hardware platforms may also limit use of such features due to missing signals (strobes).

Thus, there is a need for a method and apparatus for automatic optimization of RF receiver interference performance without the hardware and software problems descried above.

SUMMARY OF THE INVENTION

According to some embodiments of the invention, a method for optimization of RF receiver interference performance in a mobile phone operating in a TDMA communications system, comprising the steps of: measuring battery supply voltage ripple of the battery of the mobile phone; determining when the battery supply voltage ripple is greater than a predetermined level; and adjusting the RF receiver for improving the mode of operation of the RF receiver when the battery supply voltage ripple is greater than the predetermined level.

According to another embodiment of the invention, an RF receiver in a mobile phone operating in a TDMA communications system, comprising: a first band pass filter for filtering a received signal; a low noise amplifier for amplifying the filtered received signal; a mixer for mixing the amplified signal; a second band pass filter for filtering the mixed signal; and a processor powered by a battery of the mobile phone wherein the processor measures battery supply voltage ripple of the battery of the mobile phone, determines when the battery supply voltage ripple is greater than a predetermined level, and adjusts the RF receiver for improving the mode of operation of the RF receiver when the battery supply voltage ripple is greater than the predetermined level.

According to another embodiment of the invention, a computer readable medium storing code for optimization of RF receiver interference performance, comprising: code for measuring battery supply voltage ripple of the battery of the mobile phone; code for measuring interference of received signals at the RF receiver; code for determining when the measured interference and measured battery supply voltage ripple are both greater than predetermined levels; and code for adjusting the RF receiver for improving the mode of operation of the RF receiver when the interference and measured battery supply voltage ripple are greater than the predetermined levels.

Further embodiments of the invention are defined in the dependent claims.

BRIEF DESCRIPTION OF THE DRAWINGS

Further objects, features and advantages of embodiments of the invention will appear from the following detailed description of the invention, reference being made to the accompanying drawings, in which.

DETAILED DESCRIPTION OF EMBODIMENTS

Figure 1:
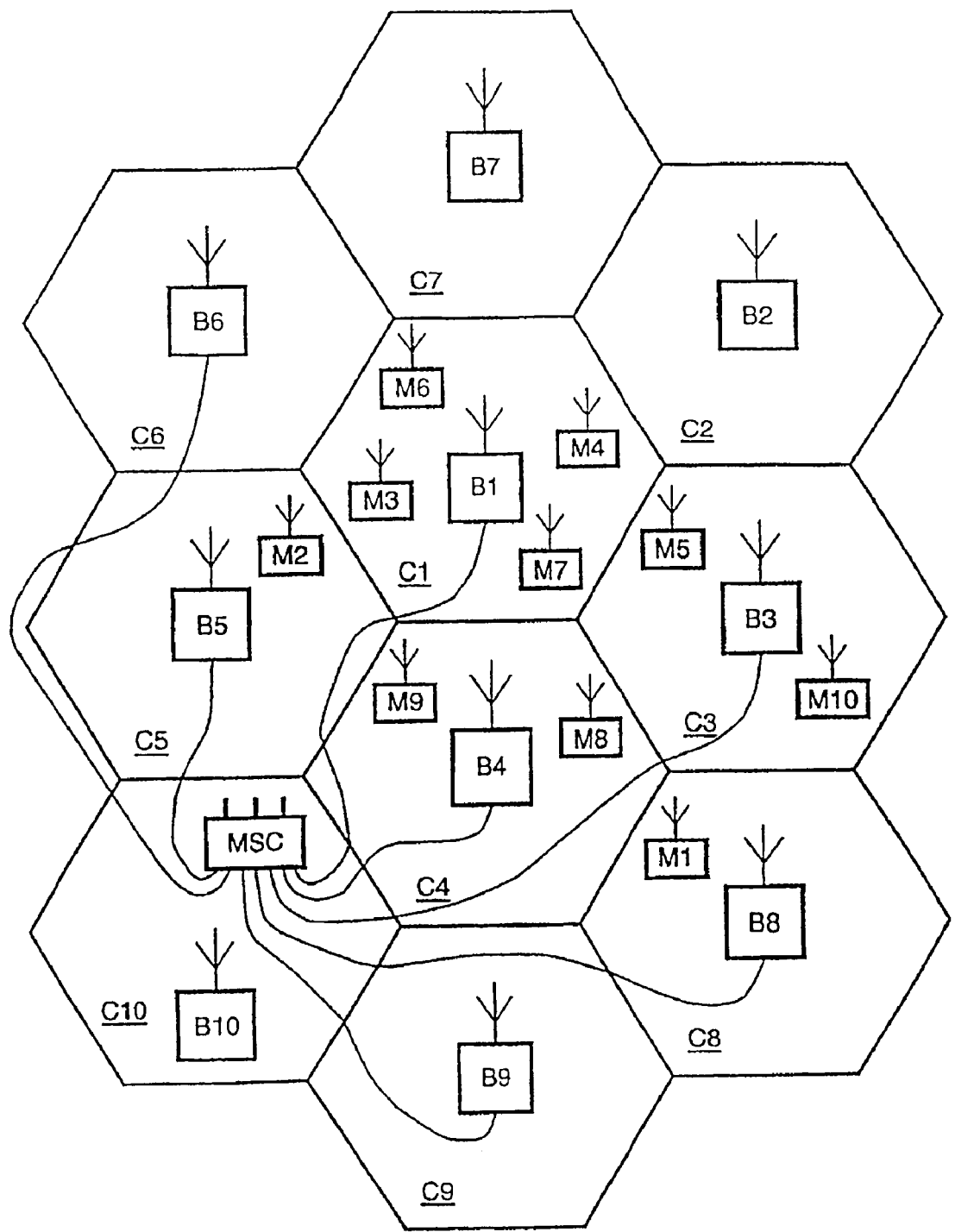
FIG. 1 illustrates a known mobile phone environment.

Specific illustrative embodiments of the invention will now be described with reference to the accompanying drawings. This invention may, however, be embodied in many different forms and should not be construed as limited to the embodiments set forth herein. Rather, the disclosed embodiments are provided so that this specification will be thorough and complete, and will fully convey the scope of the invention to those skilled in the art. The terminology used in the detailed description of the particular embodiments illustrated in the accompanying drawings is not intended to be limiting of the invention. Furthermore, in the drawings like numbers refer to like elements.

FIG. 1 illustrates ten cells C1 to C10 in a cellular TDMA mobile radio system in which the present invention may be used. For each cell C1 to C10 there in a corresponding base station, abbreviated BS, denoted B1 to B10. The BSs are situated in the center of the cells and have omnidirectional antennas. Ten mobile stations or more bulky, vehicle installed stations, powered by the vehicles electric power system. The BSs are moveable within a cell and form one cell to another. A mobile switching center, abbreviated MSC, is connected to all the BSs by cables or any other fixed means, like a radio link. Some of these cables or means are omitted in FIG. 1 for simplicity. The MSC is also connected by cables or links to a fixed public telephone network or a similar fixed communication network.

During operation the mobile stations will be in contact with the fixed part of the system by transmission of radio signals to, and reception of radio signal from, the different base stations. Telephone calls, data communication links or other communication paths may be set up between one mobile station and another mobile station in the system. Calls may also be set up to mobiles in another system or subscribers in the fixed network. In this application these are all called connections irrespective of whether they originate in a mobile or end in a mobile.

FIG. 1 typically represents part of a larger system. Normally the system will comprise more cells and base stations. There may be umbrella cells each covering an area also covered by a group of micro cells. Also the number of mobile stations will normally by much larger. Base stations located in the vicinity of the cell borders and with sector antennas are also common. Some cells may be served by more than one base station. Several other MSCs with connected base stations will normally exist and the mobile stations are usually free to communication via these MSCs.

Figure 2:
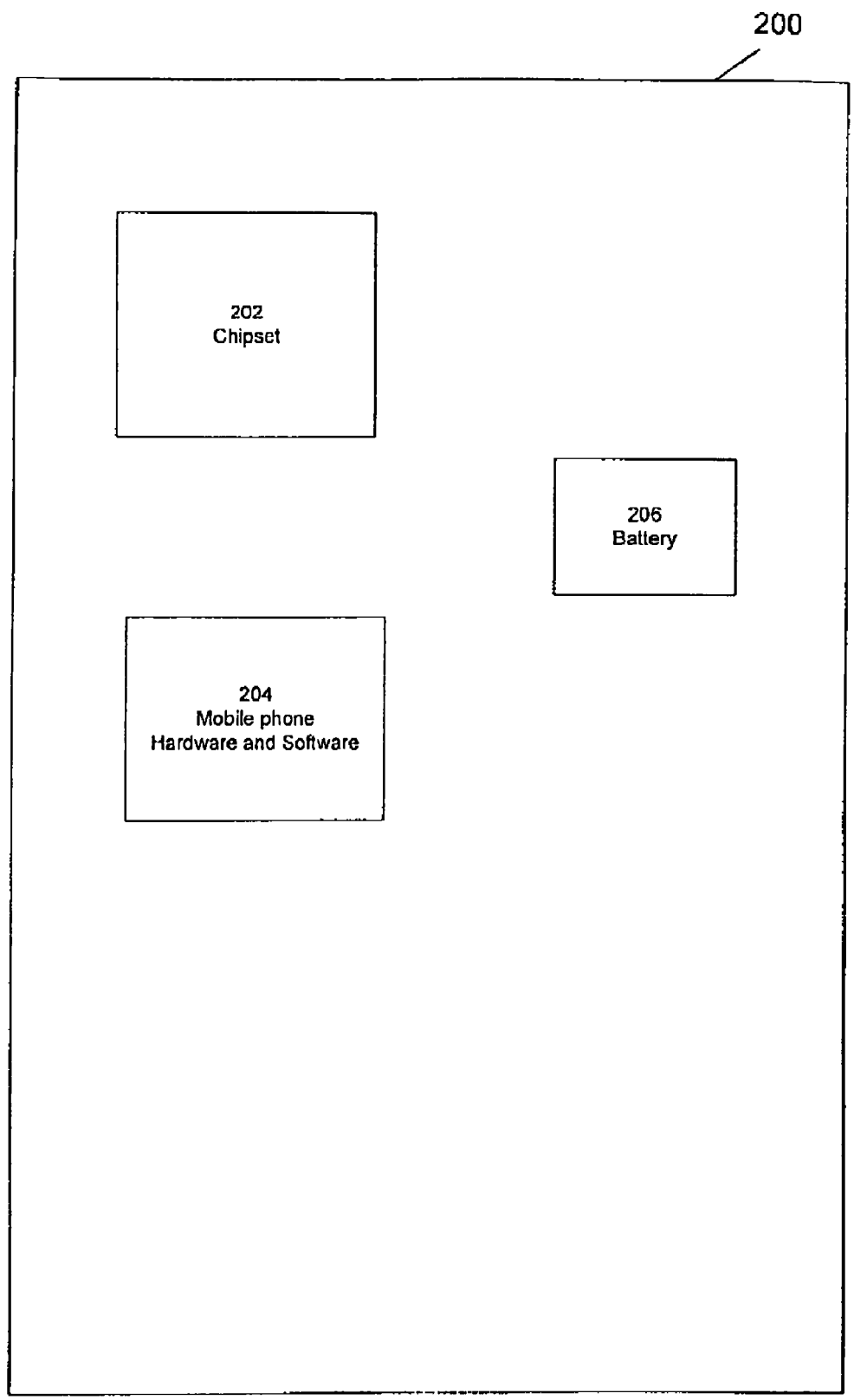
FIG. 2 illustrates mobile phone components according to one embodiment of the invention.

FIG. 2 illustrates a mobile phone 200 according to one embodiment of the invention. The mobile phone 200 comprises, among other features, a transmit and receive chipset 202, mobile phone hardware and software 204 for controlling the operation of the mobile phone 200 and a battery 206. The battery 206 supplies power to the mobile phone hardware and software 204 and the chipset 202.

Figure 3:
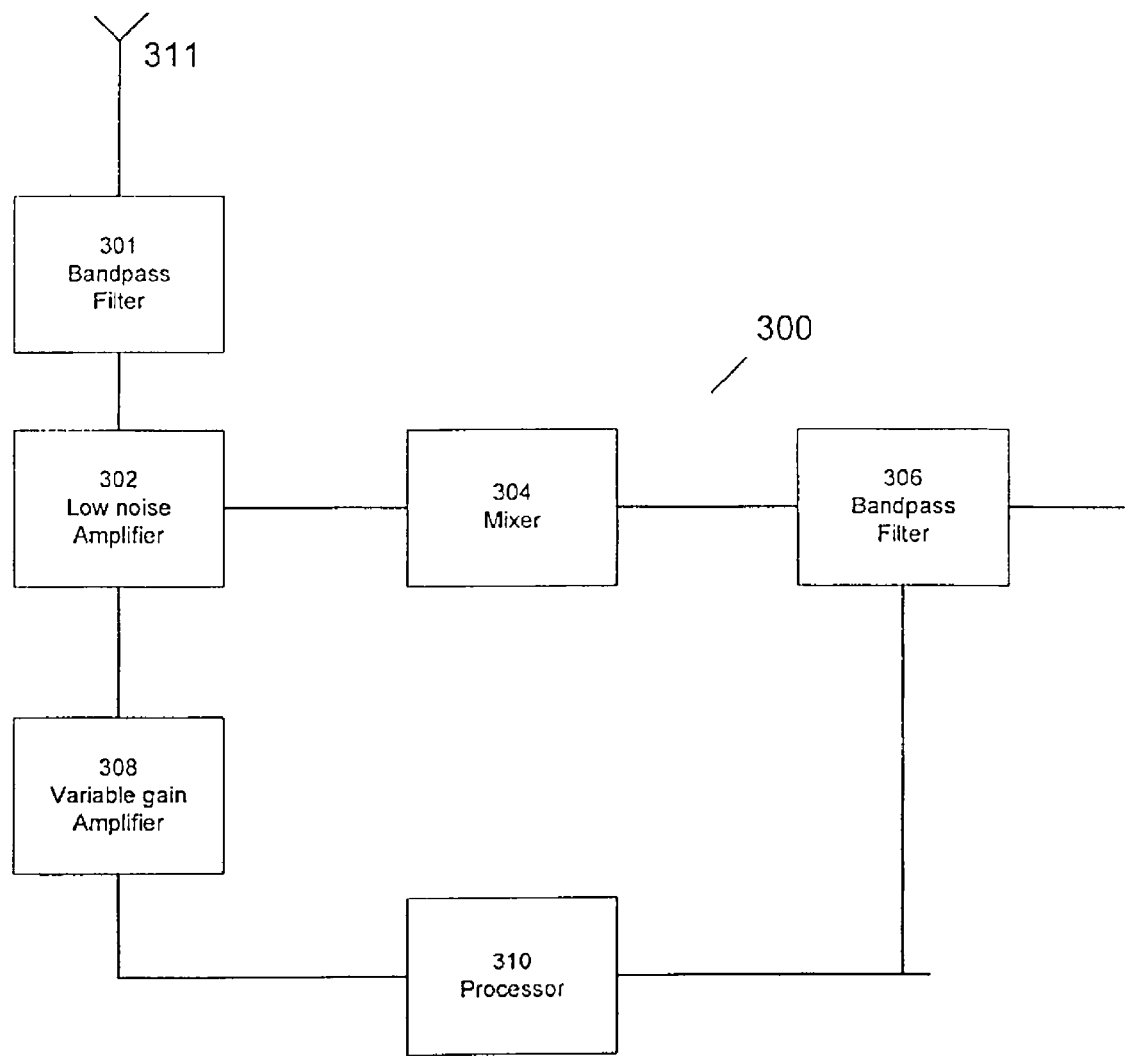
FIG. 3 illustrates radio processor components according to one embodiment of the invention.
Figure 4:
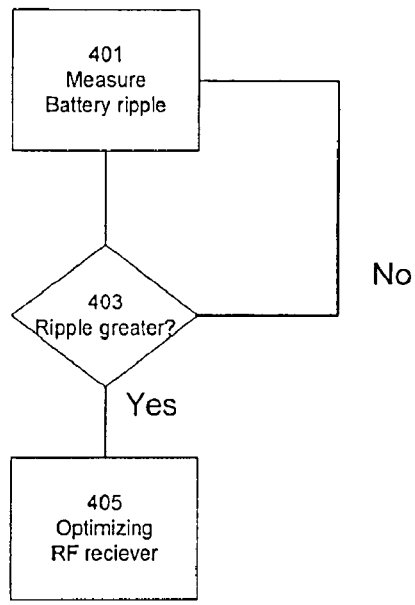
FIG. 4 is a flow chart describing the operation of the RF receiver according to one embodiment of the invention.

FIG. 3. illustrates a radio processor 300 according to one embodiment of the invention. The radio processor 300 comprises, among other features, a band pass filter 301, a low noise amplifier 302, a mixer 304, a bandpass filter 306, a variable gain amplifier 308 and a processor 310. Generally, when a signal is received by the antenna 311, the received signal is filtered by the band pass filter 301 to attenuate other (out of band) radio transmitter signals. The filtered signal is then amplified by the low noise amplifier 302 using a gain value from the variable gain amplifier 308. The amplified received signal is then mixed by the mixer 304. The mixed signal is then filtered by the bandpass filter 306. The resulting IF signal is then outputted to a baseband processor (not illustrated) for further processing. The operation of the low noise amplifier 302, mixer 304, bandpass filter 306 and the variable gain amplifier may be controlled by the processor 310. The operation of the radio processor 300 according to various embodiments of the invention will be described below with reference to FIGS. 4-5.

According to the invention, the processor 310 is connected to the battery 206 of the mobile phone. As a result, the processor 310 can monitor the operation of the battery 206 by monitoring and measuring the battery supply voltage ripple or current consumption variations in step 401. The processor 310 then compares the measured battery supply voltage ripple with a predetermined level in step 403. When the battery supply voltage ripple is greater than the predetermined level, the battery 206 is causing interference at the receiver. As a result, the processor 310 can adjust the variable gain of the variable gain amplifier 308 in a known manner to improve (optimize) the mode of operation of the receiver in the presence of the interference.

Figure 5:
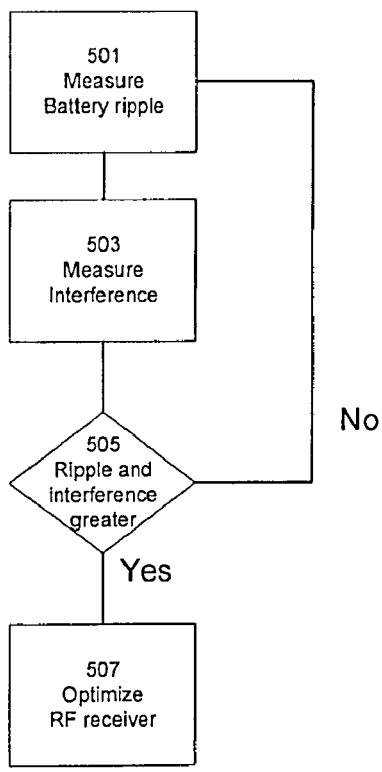
FIG. 5 is a flow chart describing the operation of the RF receiver according to one embodiment of the invention.

According to another embodiment of the invention, in addition to measuring the battery supply voltage ripple as described above, the radio processor 300 can measure the interference of the received signal and use both the measured battery supply voltage ripple and the measured interference values when determining how to adjust the gain of the low noise amplifier 302, as described in FIG. 5. In step 501, the processor 310 measures the battery supply voltage ripple or current consumption variation of the battery 206. The processor 310 also measures the interference of the received signal in step 503. The level of interference can be measured in several ways and the invention is not limited thereto. For example, the processor 310 can measure the signal-to-noise ratio (SNR) of the received signal using a known procedure. In addition, the processor 310 can detect the received signal strength indication levels of the received signal.

Once the interference level has been measured, the processor 310 then compares the measured battery supply voltage ripple and the measured interference level with predetermined ripple and interference levels in step 505. When the measured battery supply voltage ripple and the measured interference level are both greater than the predetermined ripple and interference levels, the processor 310 adjusts the gain of the variable gain amplifier 308 to improve (optimize) the operation of the receiver in the presence of the interference. In addition to better operation of the RF receiver, the present invention also provides several other benefits. First, filter requirements in the RF receiver may be relaxed leading to improved overall receiver performance in a mobile phone application for scenarios when no interferes are present. Second, lower power consumption for other transmitters can be achieved due to less loss in filters between the transmitter and antenna. Third, by lowering the amount of interference in the receiver, the attenuation in the base band filter 301 is also lowered which leads to better overall system performance.

Figure 6:
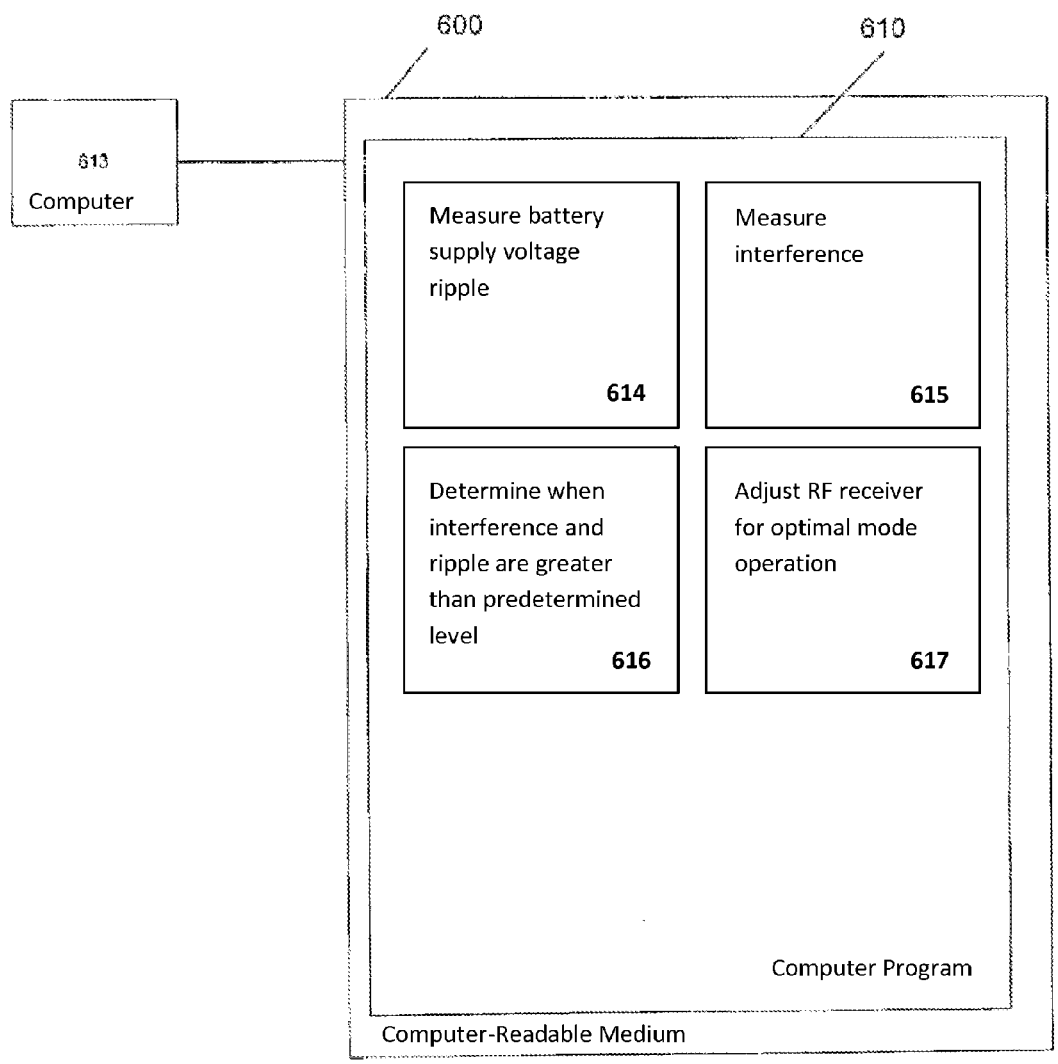
FIG. 6 is a computer system for implementing one embodiment of the invention.

In another embodiment of the invention according to FIG. 6, a computer-readable medium 600 is illustrated schematically. The computer-readable medium 600 has embodied thereon a computer program 610 for optimization of RF receiver interference performance, for processing by a computer 613. The computer program comprises a code segment 614 for measuring battery supply voltage ripple of the battery of the mobile phone; a code segment 615 for measuring interference of received signals at the RF receiver; a code segment 616 for determining when the measured interference and measured battery supply voltage ripple are both greater than predetermined levels; a code segment 617 for adjusting the RF receiver for optimal mode of operation when the interference and measured battery supply voltage ripple are greater than the predetermined levels.

The present invention has been described above with reference to specific embodiments. However, other embodiments than the above described are equally possible within the scope of the invention. Different method steps than those described above, performing the method by hardware or software or a combination of hardware and software, may be provided within the scope of the invention. It should be appreciated that the different features and steps of the invention may be combined in other combinations than those described. The scope of the invention is only limited by the appended patent claims.

What is claimed is:

1. A method for optimization of RF receiver interference performance in a mobile phone operating in a TDMA communications system, comprising the steps of:
   measuring battery supply voltage ripple of a battery of the mobile phone;
   determining when the battery supply voltage ripple is greater than a predetermined level; and
   adjusting variable gain amplifiers in the RF receiver for improving a mode of operation of the RF receiver when the battery supply voltage ripple is greater than the predetermined level.

2. The method according to claim 1, further comprising the steps of:
   measuring interference of received signals at the RF receiver;
   determining when the measured interference and measured battery supply voltage ripple are both greater than predetermined levels;
   adjusting the RF receiver for improving the mode of operation of the RF receiver when the interference and measured battery supply voltage ripple are greater than the predetermined levels.

3. The method according to claim 2, wherein said step for measuring interference comprises measuring the signal to noise ratio of the received signals.

4. The method according to claim 2, wherein said step for measuring interference comprises measuring RSSI levels of the received signals.

5. The method according to claim 2, wherein said step for measuring interference comprises measuring the signal to noise ratio and the RSSI levels of the received signals.

6. The method according to claim 1, wherein the RF receiver measures the battery supply ripple of the battery of the mobile phone.

7. An RF receiver in a mobile phone operating in a TDMA communications system, comprising:
   a first band pass filter for filtering a received signal;
   a low noise amplifier for amplifying the filtered received signal;
   a mixer for mixing the amplified signal;
   a second band pass filter for filtering the mixed signal; and
   a processor powered by a battery of the mobile phone wherein the processor measures battery supply voltage ripple of the battery of the mobile phone, determines when the battery supply voltage ripple is greater than a predetermined level, and adjusts variable gain amplifiers in the RF receiver for improving the mode of operation of the RF receiver when the battery supply voltage ripple is greater than the predetermined level.

8. The RF receiver according to claim 7, wherein the processor further measures interference of received signals at the RF receiver, determines when the measured interference and measured battery supply voltage ripple are both greater than predetermined levels, and adjusts the RF receiver for improving the mode of operation of the RF receiver when the interference and measured battery supply voltage ripple are greater than the predetermined levels.

9. The RF receiver according to claim 8, wherein the interference is measured by measuring the signal to noise ratio of the received signals.

10. The RF receiver according to claim 8, wherein the interference is measured by measuring RSSI levels of received signals.

11. The RF receiver according to claim 8, wherein the interference is measured by measuring the signal to noise ratio and the RSSI levels of the received signals.

12. A computer readable medium storing code for optimization of RF receiver interference performance, comprising:
   code for measuring battery supply voltage ripple of the battery of the mobile phone;
   code for measuring interference of received signals at the RF receiver;
   code for determining when the measured interference and measured battery supply voltage ripple are both greater than predetermined levels; and
   code for adjusting variable gain amplifiers in the RF receiver for improving the mode of operation of the RF receiver when the interference and measured battery supply voltage ripple are greater than the predetermined levels.

* * * * *